E. B. GIBBS.

Assignor of one-half to W. J. HARRIS.

SPARK ARRESTER FOR LOCOMOTIVES.

No. 11,146. Reissued Feb. 17, 1891.

Witnesses.

Jos. W. Crooks

W. M. Byrne

Inventor.

Edward B. Gibbs by

Paul Bakewell his attorney

THE NORRIS PETERS CO., PHOTO-LITHO., WASHINGTON, D. C.

UNITED STATES PATENT OFFICE.

EDWARD B. GIBBS, OF NORTH PLATTE, NEBRASKA, ASSIGNOR OF ONE-HALF TO W. JOHN HARRIS, OF ST. LOUIS, MISSOURI.

SPARK-ARRESTER FOR LOCOMOTIVES.

SPECIFICATION forming part of Reissued Letters Patent No. 11,146, dated February 17, 1891.

Original No. 422,586, dated March 4, 1890. Application for reissue filed May 13, 1890. Serial No. 351,704.

*To all whom it may concern:*

Be it known that I, EDWARD B. GIBBS, a citizen of the United States, residing at North Platte, in the county of Lincoln, State of Nebraska, have invented a certain new and useful Improvement in Spark-Arresters for Locomotives, of which the following is a full, clear, and exact description.

My invention relates to an improvement in that class of spark-arresters in which a baffle-plate across the smoke-box is combined with a perforated screen, and has for its object to extinguish the sparks and effect subsequently a more thorough discharge thereof through the smoke-stack.

It consists in features of novelty, as hereinafter claimed.

Figure 1:
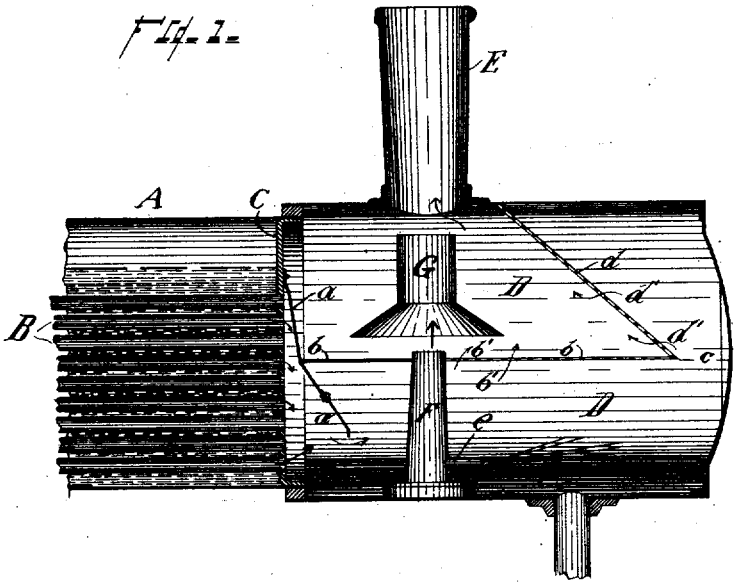
Figure 2:
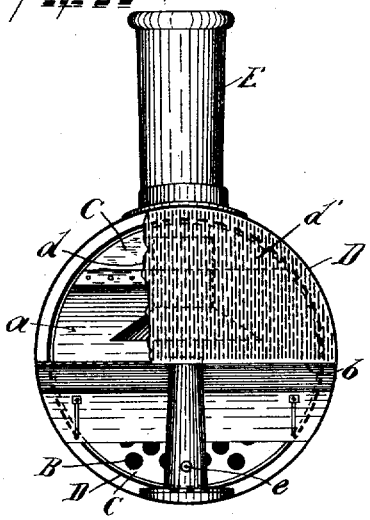
Figure 3:
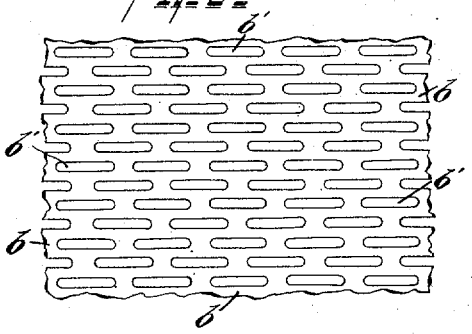

On the accompanying drawings, Figure 1 represents a longitudinal sectional view of the smoke-box and adjacent part of the body of a locomotive-boiler fitted with my invention; Fig. 2, an end view of the smoke-box omitting the door, and Fig. 3 a detached view, to an enlarged scale, of a portion of the perforated screens forming part of my invention, like letters of reference denoting like parts in all the figures.

A represents the body, and B the tubes broken away, of a locomotive-boiler having the flue-plate C, smoke-box D, smoke-stack E, blast-pipe F, and induction or "petticoat" pipe G, all of said parts being of the ordinary well-known types. To the flue-plate C, immediately above the top row of tubes B, is fixed the upper edge of a baffle-plate *a*, which extends entirely across the smoke-box D, and preferably inclines downward and forward from its junction with the flue-plate C to a certain distance, whence it is directed downward and forward at a greater inclination by an adjustable portion toward its lower edge, which is adjusted to a suitable distance from the flue-plate C and bottom of the smoke-box D.

To the baffle-plate *a*, preferably at the junction of its two inclined portions, is secured the rear end of a horizontal screen *b*, which consists, preferably, of thin sheet-iron and extends entirely across the smoke-box D, and to a suitable distance forward, so as to leave a space or opening *c* between its front end and the front end of the smoke-box D, as shown. Through the screen *b*, over that portion only of its surface in front of the blast-pipe F, are formed vertical holes *b'*, which are preferably of an oblong shape, and arranged as shown more particularly in Fig. 3, but may be of any other desired form and arrangement.

Along the front end of the perforated screen *b* is fixed the lower edge of a second screen *d*, which extends therefrom entirely across the upper portion of the smoke-box D at a suitable inclination rearward toward the smoke-stack E. Through this screen *d* over its entire surface are holes *d'*, which may be of similar shape and arrangement to the holes *b'* of the screen *b*, or otherwise, as desired.

Opening from the blast-pipe F toward the front of the smoke-box D are jets or nozzles *e*, through which steam from the blast-pipe F passes into the lower and front portions of the smoke-box D, beneath the screen *b* and in front of the inclined screen *d*, respectively.

By the above arrangement the incandescent sparks as they issue from the tubes B in front of the flue-plate C are diverted downward by the baffle-plate *a* to the lower portion of the smoke-box D, beneath the screen *b*, where they are extinguished by the steam from the pipes *e*, and are partly carried off by the draft through the perforations *b'*, the remainder being swept upward through the forward space or opening *c* into the upper forward portion of the smoke-box D, in front of the inclined screen *d*, through the holes *d'* of which they are finally carried off by the draft through the smoke-stack E instead of accumulating in and obstructing the lower portion of the smoke-box D, as occurs with existing arrangements of this class.

By this invention a large area of perforated screen-surface being obtained, the effect of the steam-jets *e*, combined with the draft from the blast-pipe F, enables the extinguished sparks to be carried off with the smoke more effectually than heretofore, thereby avoiding the necessity of frequent stoppages for cleaning out the smoke-box.

When desired, the jet pipes or nozzles *e* may be omitted, in which case the advantage peculiar to these nozzles, and which is above described, is done away with, yet there is present a substantial improvement in that the draft of the engine is preserved and the cinders are arrested in the upper chamber, and by the combined action of the draft and the inclined screen are kept in motion on the surface of the inclined screen until they become broken into particles fine enough to pass through the screen to the smoke-stack, thus extinguishing the sparks and keeping the smoke-box free from accumulation of cinders.

I claim as my invention—

1. In a locomotive-engine, the combination, with the smoke-box and induction-pipe, of a horizontal screen which terminates forward of the induction-pipe, and a transverse forwardly and downwardly inclined screen located in front of the smoke-stack and which meets the horizontal screen at an angle, whereby the cinders are arrested in the upper chamber and kept in motion on the inclined screen, substantially as and for the purposes described.

2. In a locomotive-engine, the combination, in the smoke-box, of a baffle-plate *a*, a horizontal perforated screen *b*, an induction-pipe G, and an inclined perforated screen *d*, the said screens *b d* being arranged to divide the smoke-box into lower and upper spark-arresting chambers communicating with each other by a space or opening *c* with jet pipes or nozzles *e*, admitting steam from the blast-pipe to said chamber, substantially as shown, and for the purpose described.

3. In a locomotive-engine, the combination, with the smoke-box and induction-pipe, of a baffle-plate and a transverse forwardly and downwardly inclined screen located above and in advance of the induction-pipe and terminating short of the forward portion of the smoke-box, whereby the cinders are arrested in the upper chamber and kept in motion on the inclined screen, substantially as and for the purposes described.

In testimony whereof I affix my signature, in presence of two witnesses, this 9th day of April, 1890.

EDWARD B. GIBBS.

Witnesses:
PAUL BAKEWELL,
JOS. W. CROOKES.